(12) United States Patent
Shvodian

(10) Patent No.: US 7,492,789 B2
(45) Date of Patent: Feb. 17, 2009

(54) METHOD AND SYSTEM FOR DYNAMIC AGGREGATION IN A WIRELESS NETWORK

(75) Inventor: William M. Shvodian, McLean, VA (US)

(73) Assignee: Freescale Semiconductor, Inc., Austin, TX (US)

(*) Notice: Subject to any disclaimer, the term of this patent is extended or adjusted under 35 U.S.C. 154(b) by 448 days.

(21) Appl. No.: 10/546,218

(22) PCT Filed: Feb. 27, 2004

(86) PCT No.: PCT/US2004/003363

§ 371 (c)(1),
(2), (4) Date: Aug. 18, 2005

(87) PCT Pub. No.: WO2004/079971

PCT Pub. Date: Sep. 16, 2004

(65) Prior Publication Data

US 2006/0153232 A1    Jul. 13, 2006

Related U.S. Application Data

(60) Provisional application No. 60/450,317, filed on Feb. 28, 2003.

(51) Int. Cl.
*H04L 12/56* (2006.01)

(52) U.S. Cl. .................. 370/469; 370/470; 370/474; 370/476

(58) Field of Classification Search .......... 370/470, 370/469, 474, 476, 471, 473, 395.6
See application file for complete search history.

(56) References Cited

U.S. PATENT DOCUMENTS

| 5,278,834 | A  |   | 1/1994  | Mazzola |
| 5,699,364 | A  | * | 12/1997 | Sato et al. ............... 714/708 |
| 6,480,507 | B1 | * | 11/2002 | Mercer et al. ............ 370/469 |
| 6,614,808 | B1 | * | 9/2003  | Gopalakrishna ......... 370/469 |

(Continued)

FOREIGN PATENT DOCUMENTS

EP    1 175 034 A2    1/2002

OTHER PUBLICATIONS

Notification of the First Office Action dated Oct. 24, 2008 in corresponding Chinese Patent Application No. 200480005361.X (a copy and English translation thereof).

*Primary Examiner*—Min Jung

(57) ABSTRACT

A method is provided for dynamically controlling aggregation in an ultrawide bandwidth wireless device. In this method, a device receives a plurality of intermediate service data units at an intermediate layer, aggregates at least two of the plurality off intermediate service data units to form an intermediate protocol data unit, and sends the intermediate protocol data unit to a physical layer. The physical layer generates a data frame based on the intermediate protocol data unit and information corresponding to the physical layer, and transmits the data frame in a data stream. The device selects an intermediate size criteria for the intermediate protocol data unit based on a desired frame size criteria for the data frame. The aggregating of the at least two of the plurality of intermediate layer service data units is performed such that an actual intermediate layer protocol data unit size corresponds to the intermediate size criteria.

24 Claims, 11 Drawing Sheets

U.S. PATENT DOCUMENTS

| | | | |
|---|---|---|---|
| 6,931,025 B1 * | 8/2005 | Masuda | 370/466 |
| 6,977,932 B1 * | 12/2005 | Hauck | 370/392 |
| 7,096,274 B1 * | 8/2006 | Ci et al. | 709/236 |
| 7,145,876 B2 * | 12/2006 | Huang et al. | 370/232 |
| 7,286,560 B2 * | 10/2007 | Samadi et al. | 370/466 |
| 7,289,521 B2 * | 10/2007 | Herle et al. | 370/401 |
| 2002/0091853 A1 * | 7/2002 | Moore et al. | 709/236 |
| 2003/0161326 A1 * | 8/2003 | Pazhyannur et al. | 370/395.52 |

* cited by examiner

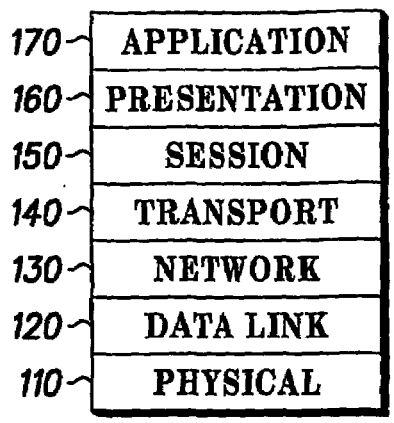
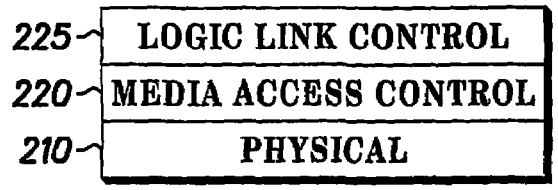
100 FIG. 1   200 FIG. 2
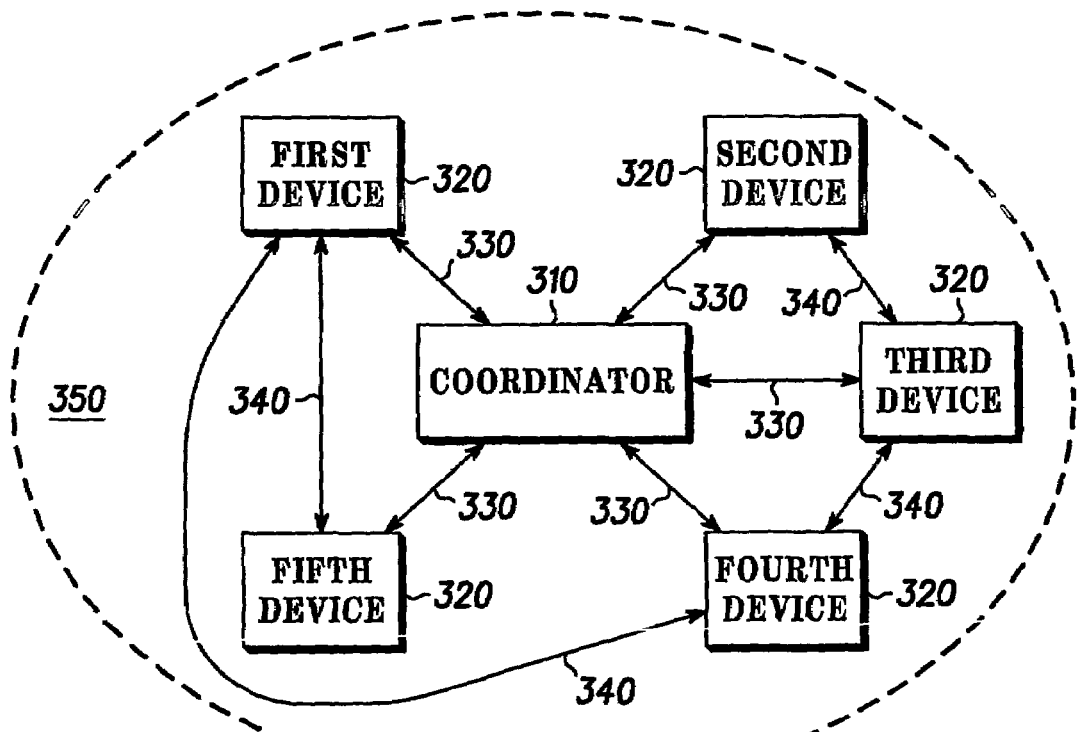
300 FIG. 3

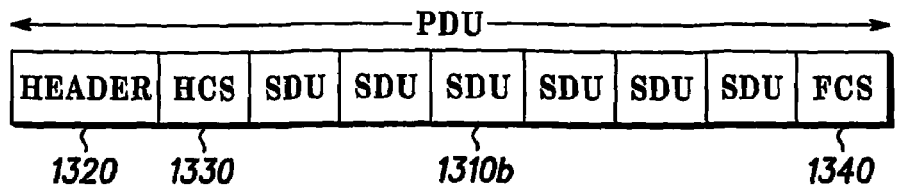
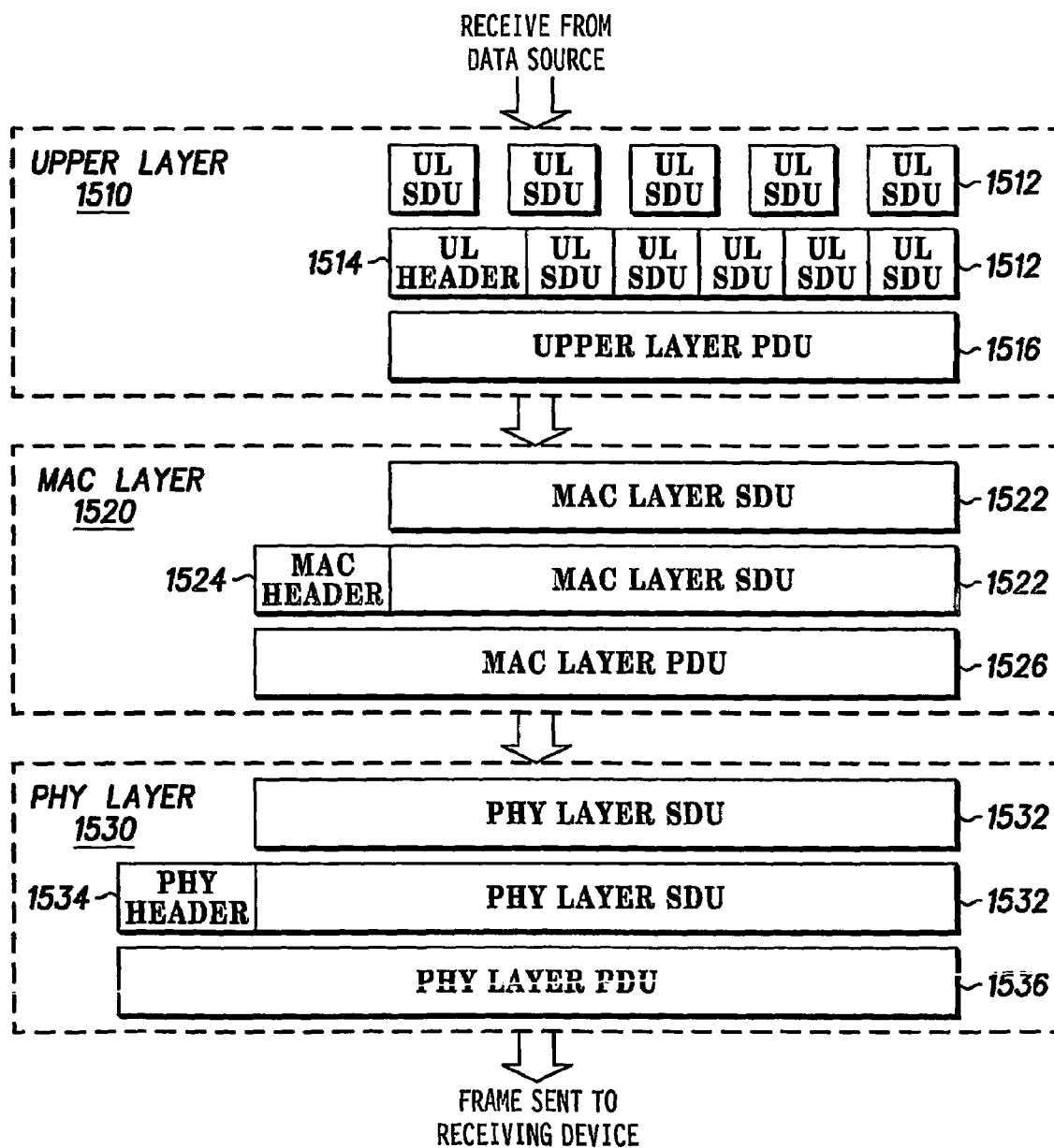

ial Application PCT/US04/03363, which relies for priority on U.S. provisional application Ser. No. 60/450,317, by William M. Shvodian et al., filed Feb. 28, 2003, entitled "METHOD AND SYSTEM FOR DYNAMIC PACKET AGGREGATION FOR WIRELESS NETWORKS," the contents of which are hereby incorporated by reference in its entirety.

METHOD AND SYSTEM FOR DYNAMIC AGGREGATION IN A WIRELESS NETWORK

CROSS-REFERENCE TO RELATED PATENT DOCUMENTS

This application is a national stage application of International Application PCT/US04/03363, which relies for priority on U.S. provisional application Ser. No. 60/450,317, by William M. Shvodian et al., filed Feb. 28, 2003, entitled "METHOD AND SYSTEM FOR DYNAMIC PACKET AGGREGATION FOR WIRELESS NETWORKS," the contents of which are hereby incorporated by reference in its entirety.

FIELD OF THE INVENTION

The present invention relates in general to wireless communication systems, such as ultrawide bandwidth (UWB) systems, including mobile transceivers, centralized transceivers, and related equipment. More specifically the present invention relates to the transmission of data between two wireless devices in a manner that reduces or eliminates the amount of fragmentation required while transmitting data between two devices.

BACKGROUND OF THE INVENTION

Many wireless networks, including UWB networks, send information between devices in the network through the use of discrete data frames. Data at a transmitter is broken up into discrete pieces of data, which are processed, placed into frames, and sent over a wireless channel. The receiver then takes the received frames, extracts the embedded information, and reconstructs the data that was sent by the transmitter.

Some of the parameters for a data frame must remain fixed, such as its header composition. But others, such as frame size can vary a great deal. For example, frame size can be varied in response to the quality of the channel being used for transmission. Smaller data frames generally have a lower probability of packet error rate and so using smaller packets can improve the probability that a frame will be successfully transmitted.

A device could thus use a large frame size when the channel is of good quality, and then move to a smaller frame size when the channel quality deteriorates. Then, if the channel quality improves, the device could return to using the larger frame size.

Frame size is generally handled at a medium access control (MAC) layer. The MAC layer receives data in discrete blocks and then can either forward these blocks on for transmission as they are, group multiple blocks together for transmission, or break a block up into multiple pieces for transmission. Aggregation is what happens when multiple blocks of data are grouped together, and fragmentation is what happens when one block of data is broken up into multiple pieces.

But although aggregation and fragmentation provide advantages in allowing for greater flexibility in frame size, they also impose some disadvantages. Primarily, they require additional circuitry and time to handle the aggregation and fragmentation on the transmitting end, and also additional time and circuitry on the receiving end split apart aggregated data and reassemble fragmented data (called defragmentation). Of these two, defragmentation data is much more complex and is also more time consuming.

Accordingly, it would be desirable in the art for a solution to the problems associated with fragmentation. In particular, it would be desirable to provide a UWB device that avoids the use of fragmentation, yet still provides flexibility in determining data frame size.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

FIG. 1 is a block diagram of the hierarchy of the seven-layered OSI standard;

FIG. 2 is a block diagram of the IEEE 802 standard;

FIG. 3 is a block diagram of an exemplary wireless network that could use the IEEE 802 standard, according to a preferred embodiment of the present invention;

FIG. 14 shows a PHY PDU format for sending multiple SDUs in a frame, according to a preferred embodiment of the present invention;

FIG. 15 is a block diagram of a three-layer transmitting device employing aggregation according to a preferred embodiment of the present invention;

DETAILED DESCRIPTION OF PREFERRED EMBODIMENTS

Figure 4:
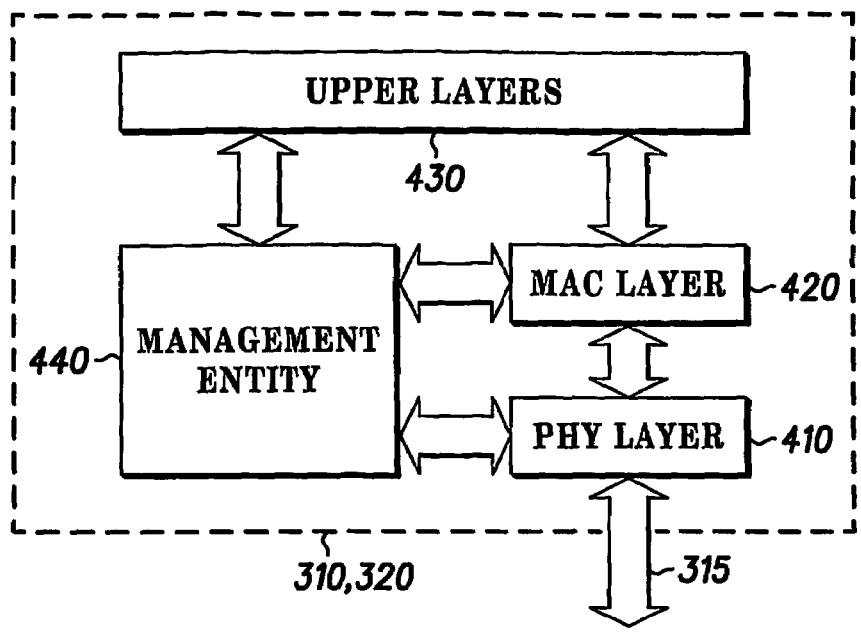
FIG. 4 is a block diagram of an exemplary device from the network of FIG. 3, according to a preferred embodiment of the present invention.

In overview, the present disclosure concerns a method and circuit that can be used to vary the size of a frame in a wireless device, but can avoid using fragmentation. In this way the device can improve transmission quality through the use of variable frame sizes, but will not have to pay the performance cost associated with the use of fragmentation.

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

FIG. 1 is a block diagram of the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 170.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 170 is where communication partners are identified, quality of service is identified, user authentication and privacy are considered, and any constraints on data syntax are identified.

The IEEE 802 Committee has developed a three-layer architecture for local networks that roughly corresponds to the physical layer 110 and the data link layer 120 of the OSI standard 100. FIG. 2 is a block diagram of the IEEE 802 standard.

As shown in FIG. 2, the IEEE 802 standard 200 includes a physical (PHY) layer 210, a medium access control (MAC) layer 220, and a logical link control (LLC) layer 225. The PHY layer 210 operates essentially as the PHY layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged.

Network

FIG. 3 is a block diagram of an exemplary wireless network that could use the IEEE 802 standard, according to a preferred embodiment of the present invention. In a preferred embodiment the network 300 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations) follow the time allocation instructions of the coordinator (i.e., they function as clients). One primary difference between the coordinator and non-coordinator devices is that the coordinator must be able to communicate with all of the devices in the network, while the various non-coordinator devices need not be able to communicate with all of the other non-coordinator devices.

As shown in FIG. 3, the network 300 includes a coordinator 310 and a plurality of non-coordinator devices 320. The coordinator 310 serves to control the operation of the network 300. As noted above, the system of coordinator 310 and non-coordinator devices 320 may be called a piconet, in which case the coordinator 310 may be referred to as a piconet coordinator (PNC). Each of the non-coordinator devices 320 must be connected to the coordinator 310 via primary wireless links 330, and may also be connected to one or more other non-coordinator devices 320 via secondary wireless links 340, also called peer-to-peer links.

In addition, although FIG. 3 shows bi-directional links between devices, they could also be unidirectional. In this case, each bi-directional link 330, 340 could be shown as two unidirectional links, the first going in one direction and the second going in the opposite direction.

In some embodiments the coordinator 310 may be the same sort of device as any of the non-coordinator devices 320, except with the additional functionality for coordinating the system, and the requirement that it communicate with every device 320 in the network 300. In other embodiments the coordinator 310 may be a separate designated control unit that does not function as one of the devices 320.

Through the course of the following disclosure the coordinator 310 will be considered to be a device just like the non-coordinator devices 320. However, alternate embodiments could use a dedicated coordinator 310. Furthermore, individual non-coordinator devices 320 could include the functional elements of a coordinator 310, but not use them, functioning as non-coordinator devices. This could be the case where any device is a potential coordinator 310, but only one actually serves that function in a given network.

Each device of the network 300 may be a different wireless device, for example, a digital still camera, a digital video camera, a personal data assistant (PDA), a digital music player, or other personal wireless device.

The various non-coordinator devices 320 are confined to a usable physical area 350, which is set based on the extent to which the coordinator 310 can successfully communicate with each of the non-coordinator devices 320. Any non-coordinator device 320 that is able to communicate with the coordinator 310 (and vice versa) is within the usable area 350 of the network 300. As noted, however, it is not necessary for every non-coordinator device 320 in the network 300 to communicate with every other non-coordinator device 320.

Typically, the coordinator 310 and the non-coordinator devices 320 in a WPAN share the same bandwidth. Accordingly, the coordinator 310 coordinates the sharing of that bandwidth. Standards have been developed to establish protocols for sharing bandwidth in a wireless personal area network (WPAN) setting. For example, the IEEE standard 802.15.3 provides a specification for the PHY layer 210 and the MAC layer 220 in such a setting where bandwidth is shared using a form of time division multiple access (TDMA). Using this standard, the MAC layer 220 defines frames and superframes through which the sharing of the bandwidth by the devices 310, 320 is managed by the coordinator 310 and/or the non-coordinator devices 320.

FIG. 4 is a block diagram of an exemplary device from the network of FIG. 3, according to a preferred embodiment of the present invention. As shown in FIG. 4, each device (i.e., each coordinator 310 or non-coordinator device 320) includes a physical (PHY) layer 410, a media access control (MAC) layer 420, a set of upper layers 430, and a management entity 440.

The PHY layer 410 communicates with the rest of the network 300 via a primary or secondary wireless link 330 or 340. It generates and receives data in a transmittable data format and converts it to and from a format usable through the MAC layer 420. The MAC layer 420 serves as an interface between the data formats required by the PHY layer 410 and those required by the upper layers 430. The upper layers 430 include the functionality of the device 310, 320. These upper layers 430 may include a logical link control (LLC) or the like. In a preferred embodiment one of the upper layers can be a frame convergence sub-layer. The upper layers allow the MAC layer 420 to interface with various protocols, such as TCP/IP, TCP, UDP, RTP, IP, USB, 1394, UDP/IP, ATM, DV2, MPEG, or the like.

Typically, the coordinator 310 and the non-coordinator devices 320 in a WPAN share the same bandwidth. Accordingly, the coordinator 310 coordinates the sharing of that bandwidth. Standards have been developed to establish protocols for sharing bandwidth in a wireless personal area network (WPAN) setting. For example, the IEEE standard 802.15.3 provides a specification for the PHY layer 410 and the MAC layer 420 in such a setting where bandwidth is shared using a form of time division multiple access (TDMA). Using this standard, the MAC layer 420 defines frames and superframes through which the sharing of the bandwidth by the devices 310, 320 is managed by the coordinator 310 and/or the non-coordinator devices 320.

Preferred embodiments of the present invention will be described below. And while the embodiments described herein will be in the context of a WPAN (or piconet), it should be understood that the present invention also applies to other settings where bandwidth is to be shared among several users, such as, for example, wireless local area networks (WLAN), or any other appropriate wireless network.

Superframes

In a preferred embodiment, the available bandwidth in a given network 300 is split up in time by the coordinator 310 into a series of repeated superframes. These superframes define how the available transmission time is split up among various tasks. Individual frames of information are then transferred within these superframes in accordance with the timing provided for in the superframe.

Figure 5:
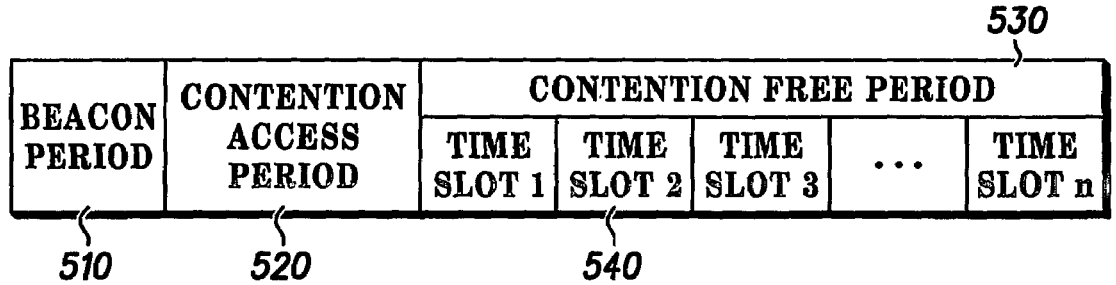
FIG. 5 is a block diagram of a superframe according to preferred embodiments of the present invention.

FIG. 5 is a block diagram of a superframe according to preferred embodiments of the present invention. As shown in FIG. 5, each superframe 500 may include a beacon period 510, a contention access period (CAP) 520, and a contention free period (CFP) 530.

The beacon period 510 is set aside for the coordinator 310 to send a beacon frame out to the non-coordinator devices 320 in the network 300. Such a beacon period 510 will include information for organizing the operation of devices 310, 320 within the superframe 500. Each non-coordinator device 320 knows how to recognize a beacon 510 prior to joining the network 300, and uses the beacon 510 both to identify an existing network 300 and to coordinate communication within the network 300.

The CAP 520 is used to transmit commands or asynchronous data across the network. The CAP 520 may be eliminated in many embodiments and the system would then pass commands solely during the CFP 530.

The CFP 530 includes a plurality of time slots 540. These time slots 540 are assigned by the coordinator 310 to a single transmitting device 310, 320 and one or more receiving devices 310, 320 for transmission of information between them. Generally each time slot 540 is assigned to a specific transmitter-receiver pair, though in some cases a single transmitter will transmit to multiple receivers at the same time. In a preferred embodiment these time slots can be used to transmit administrative information between the coordinator 310 and one of the non-coordinator devices 320, or may be used for transmitting isochronous non-administrative data between devices 310, 320 in the network 300.

The superframe 500 is a fixed time construct that is repeated in time. The specific duration of the superframe 500 is described in the beacon 510. In fact, the beacon 510 generally includes information regarding how often the beacon 510 is repeated, which effectively corresponds to the duration of the superframe 500. The beacon 510 also contains information regarding the network 300, such as the identity of the transmitter and receiver of each time slot 540, and the identity of the coordinator 310.

The system clock for the network 300 is preferably synchronized through the generation and reception of the beacons 510. Each non-coordinator device 320 will store a synchronization point time upon successful reception of a valid beacon 510, and will then use this synchronization point time to adjust its own timing.

Although not shown in FIG. 5, there are preferably guard times interspersed between time slots 540 in a CFP 530. Guard times are used in TDMA systems to prevent two transmissions from overlapping in time because of inevitable errors in clock accuracies and differences in propagation times based on spatial positions.

In a WPAN, the propagation time will generally be insignificant compared to the clock accuracy. Thus the amount of guard time required is preferably based primarily on the clock accuracy and the duration since the previous synchronization event. Such a synchronizing event will generally occur when a non-coordinator device 320 successfully receives a beacon frame from the coordinator 310. For simplicity, a single guard time value may be used for the entire superframe. The guard time will preferably be placed at the end of each beacon frame and time slot.

Frames

Figure 6:
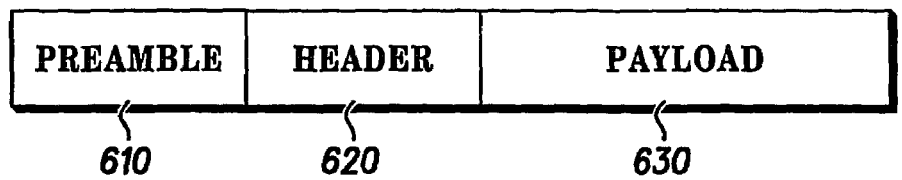
FIG. 6 is a block diagram of a frame according to a preferred embodiment of the present invention.

As noted above, signals are sent between devices in the form of frames. FIG. 6 is a block diagram of a frame according to a preferred embodiment of the present invention. Frames can be management frames, data frames, acknowledgement frames, etc. depending upon their payload.

As shown in FIG. 6, the frame 600 includes a preamble 610, a header 620, and a payload 630. Each frame 600 is preferably made up of a series of wavelets, with information in the frame 600 being represented by the wavelets or groups of wavelets called code words. In the preferred embodiment the receiving device 310, 320 is bi-phase modulated, meaning that one orientation of a wavelet or code word indicates a "1" and the inverted orientation of that wavelet or code word indicates a "0".

Although not shown, the frame 500 may include one or more check sequences (e.g. a cyclic redundancy check (CRC) to check for transmission errors. For example, the frame 600 could include a header check sequence at the end of the header 620 to perform a CRC on the header 620, or a frame check sequence at the end of the payload 630 to perform a CRC on the entire frame 600. Alternately, a check sequence could protect an individual SDU.

In the preamble 510, the transmitting device sends a known sequence of bits, while the receiving device 310, 320 listens for this known sequence in order to properly lock onto the signal. No substantive data is sent in the preamble 510, since the receiving device 310, 320 is still getting its timing synchronized with that of the transmitting device.

The header 620 includes information about the intended recipient of the frame 600 and other identifying information. In the case where a plurality of frames include fragmented data, the header 620 should also include any information necessary to correctly reassemble the fragments contained in the plurality of frames.

The payload 630 includes the substantive information being transmitted by the frame 600. This can be data if the frame is a data frame, acknowledgement information if it is an acknowledgement frame, management information if it is a management frame, etc.

Preferably, the preamble 610 and the header 620 are of fixed size, while the payload 630 may vary in size. Thus, the size of a given frame 600 will generally vary depending upon the size of the payload 630 it carries.

Protocol Data Units and Service Data Units

Although information is sent between devices in the form of frames, information is passed within a device 310, 320 in different formats. Data sent from a higher layer in a device to a lower layer or received at a higher layer from a lower layer is sent/received in the form of a protocol data unit (PDU). Data sent from a lower layer in a device to a higher layer or received at a lower layer from a higher layer is sent/received in the form of a service data unit (SDU).

Thus, a higher layer in a device will send a higher layer PDU to an intermediate layer, which will then receive it as an intermediate layer SDU. That intermediate layer could then manipulate that intermediate layer SDU in some way to form an intermediate layer PDU for that intermediate layer, which it will send to a lower layer, which will receive that intermediate layer PDU as a lower layer SDU.

Similarly, a lower layer in a device will send a lower layer SDU to an intermediate layer, which will then receive it as an intermediate layer PDU. That intermediate layer could then manipulate that intermediate layer PDU in some way to form an intermediate layer SDU for the intermediate layer and send it to a higher layer, which will receive that intermediate layer SDU as a higher layer PDU.

The format of an SDU is irrelevant to the lower device receiving it, and the content of an SDU should be transparent to the lower layer that processes it. Because the manipulation of data is handled somewhat differently based on whether a device is transmitting or receiving data, these two circumstances will be discussed separately.

Transmitter Layers

When a device is transmitting data, the highest layer in the device will receive data from local data source, and the lowest layer (i.e., the PHY layer) will ultimately transmit that data, in some form, to a remote device. Intermediate layers may process the data in some way as it is passed down from layer to layer. Each individual layer will receive data to be transmitted from a higher layer in the form of a series of SDUs, and will send data to be transmitted to a lower layer in the form of a series of PDUs.

In some cases a PDU will contain one SDU; in others a PDU will contain more than one SDU; in yet others single SDU will be broken up into multiple PDUs. Grouping multiple SDUs in a single PDU is called aggregation, and breaking up a single SDU into multiple PDUs is called fragmentation.

Figure 7:
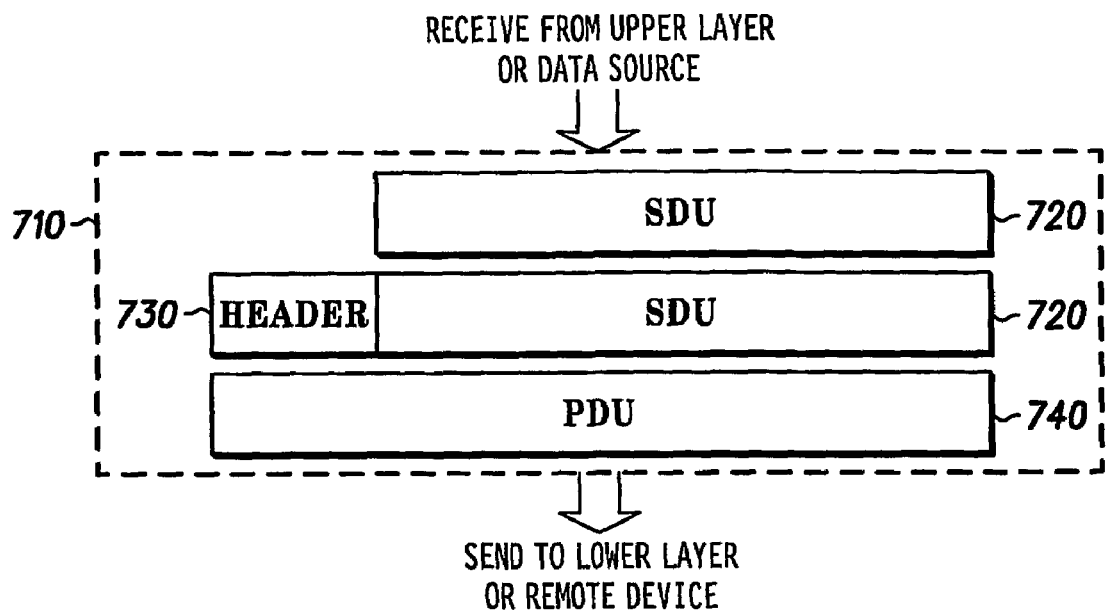
FIG. 7 is a block diagram of the data handling of a wireless device layer for transmission without fragmentation or aggregation, according to a preferred embodiment of the present invention.

FIG. 7 is a block diagram of the data handling of a wireless device layer for transmission without fragmentation or aggregation, according to a preferred embodiment of the present invention. As shown in FIG. 7, a layer 710 in a wireless device receives an SDU 720 from a higher layer or from a data source. The layer 710 then processes the SDU 720 by adding identifying information in a header 725 to it, thus creating a PDU 740. Finally, the PDU 740 is either sent on to a lower layer or is transmitted as a data frame to a remote device.

The header 730 preferably includes information necessary for a corresponding layer in a receiving device to determine how the attached SDU 720 should be handled. This could, for example, include an identifier for the data in the SDU 720 so that a large group of received SDUs 720 can be reordered at the receiving device. The header 725 can also include other information such as error correction information.

Figure 8:
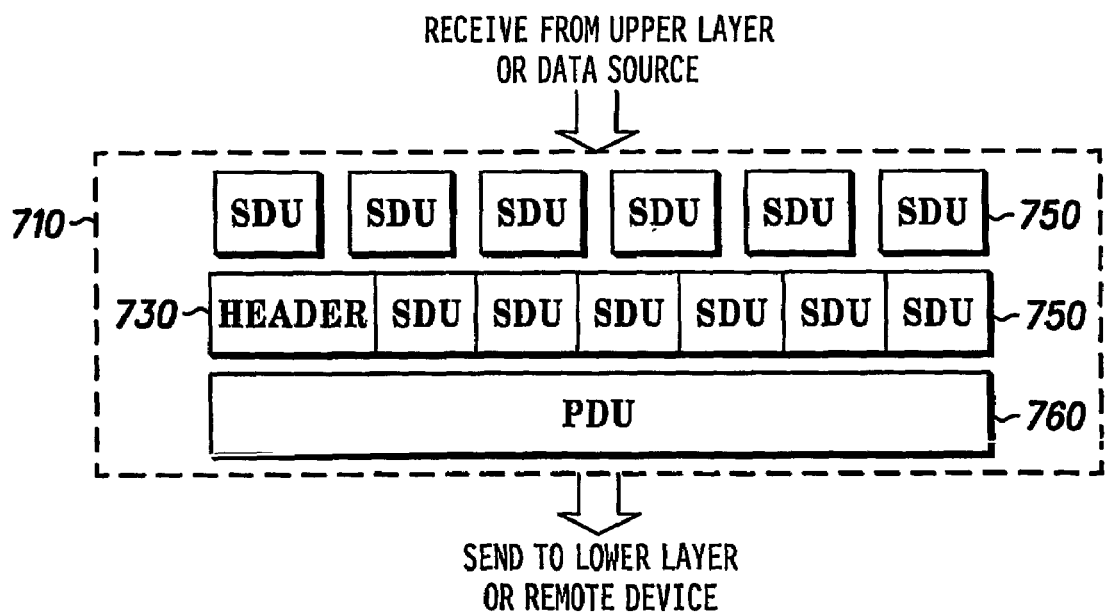
FIG. 8 is a block diagram of the data handling of a wireless device layer for transmission with aggregation, according to a preferred embodiment of the present invention.

FIG. 8 is a block diagram of the data handling of a wireless device layer for transmission with aggregation, according to a preferred embodiment of the present invention. As shown in FIG. 8, a layer 710 in a wireless device receives a plurality of SDUs 750 from a higher layer or from a data source. The layer 710 then processes the SDUs 750 by aggregating a plurality of the SDUs 750 together and adding identifying information in a header 755 to this aggregated group of SDUs 750, thus creating a PDU 760. Finally, the PDU 760 is either sent on to a lower layer or is transmitted as a data frame to a remote device.

The header 755 preferably includes information necessary for a corresponding layer in a receiving device to determine how the attached SDUs should be separated and handled. This could, for example, include an identifier for the data in the SDU 750 so that a large group of received SDUs 750 can be reordered at the receiving device. The header 755 can also include other information such as error correction information.

Figure 9:
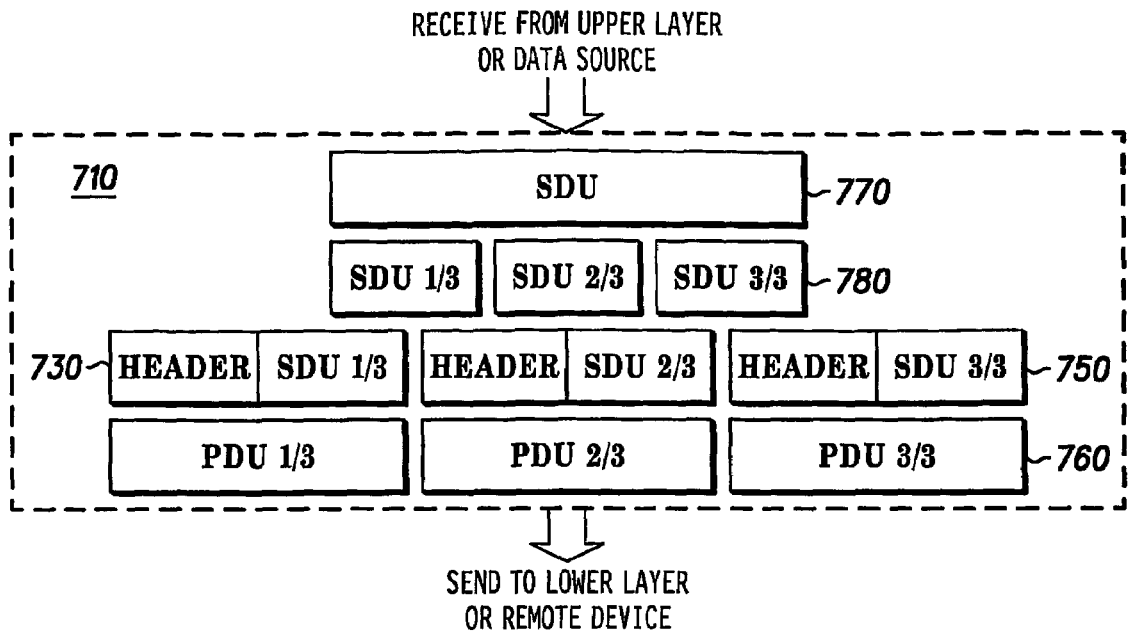
FIG. 9 is a block diagram of the data handling of a wireless device layer for transmission with fragmentation, according to a preferred embodiment of the present invention.

FIG. 9 is a block diagram of the data handling of a wireless device layer for transmission with fragmentation, according to a preferred embodiment of the present invention. As shown in FIG. 9, a layer 710 in a wireless device receives an SDU 770 from a higher layer or from a data source. The layer 710 then processes the SDU 770 by splitting the SDU 770 into SDU fragments 780, adding identifying information in a header 785 to each SDU fragment 780, thus creating a number of PDUs 790. Finally, all of the PDUs 790 are either sent on to a lower layer or is transmitted as a data frame to a remote device.

The header 785 preferably includes information necessary for a corresponding layer in a receiving device to determine how the attached SDU fragments 780 should be recombined and the resulting SDUs 770 handled. This preferably includes identifying data for each SDU fragment 780 regarding the SDU 770 it belongs to and where in that SDU 770 the fragment 780 belongs. It may also include an identifier for the data in the SDU 770 so that a large group of received SDUs 770 can be reordered at the receiving device. The header 755 can also include other information such as error correction information.

It is important during fragmentation that the SDU 770 be broken up in into SDU fragments 780 (which are later sent as PDUs 790) in a way that allows the original SDU 770 to be reconstructed from the multiple PDUs 790. This will allow the receiving device to reconstruct the original SDU 770 to pass on to its own higher layers, once it receives all of the relevant SDU fragments 780 (i.e., all the relevant PDUs 790).

Preferably when an SDU 770 is fragmented, all of the resulting PDUs 790 are set to be the same size, namely a maximum PDU size. However, one PDU 790 may be smaller to account for the fact that the size of the SDU 770 size may not be an integer multiple of the maximum PDU size. In the preferred embodiment, this will be the last PDU 790 created, being formed by the last remaining portion of the SDU 770 that is less than or equal to the maximum PDU size.

Receiver Layers

When a device is receiving data, the lowest layer (i.e., the PHY layer) in the device will receive data from a remote device, and the highest layer will ultimately transmit that data, in some form, to a local data destination. Intermediate layers may process the data in some way as it is passed up from layer to layer. Each individual layer will receive data to be transmitted form a lower layer in the form of a series of PDUs, and will send data to be transmitted to a higher layer in the form of a series of SDUs.

In some cases a PDU will contain one SDU; in others a PDU will contain more than one SDU; in yet others single SDU will be broken up into multiple PDUs. As noted above multiple SDUs are grouped in a single PDU using aggregation, and single SDUs are split up into multiple PDUs using fragmentation.

Figure 10:
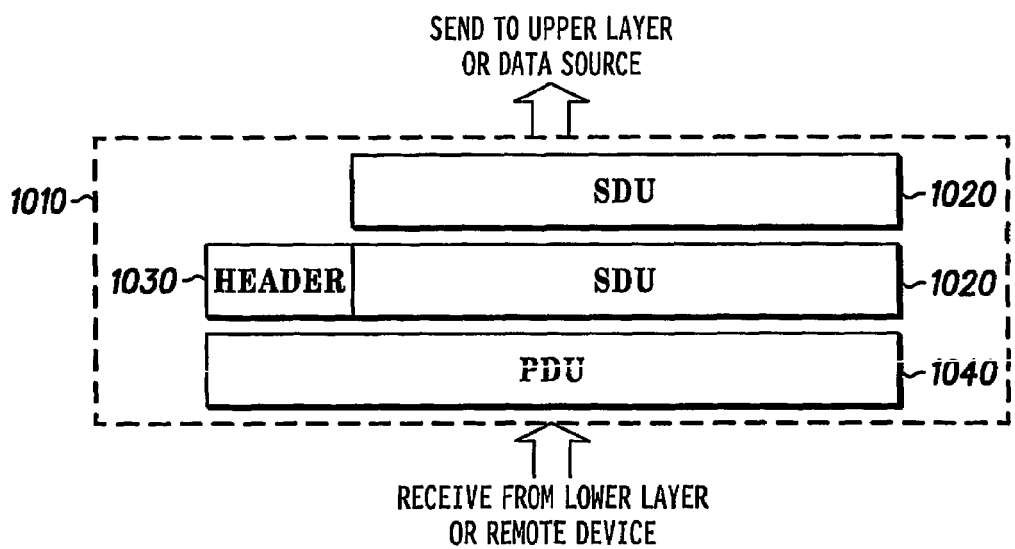
FIG. 10 is a block diagram of the data handling of a wireless device layer for reception without fragmentation or aggregation, according to a preferred embodiment of the present invention.

FIG. 10 is a block diagram of the data handling of a wireless device layer for reception without fragmentation or aggregation, according to a preferred embodiment of the present invention. As shown in FIG. 10, a layer 710 in a wireless device receives a PDU 740 from a lower layer or from a remote device. The layer 710 then processes the PDU 740 by stripping away the header 725, thus extracting the SDU 720. Finally, the SDU 720 is either sent on to a higher layer or a local data destination.

The layer 710 will use data from the header 725 to extract the SDU 720 from the PDU 740, and to determine how the SDU 720 should be further processed and routed. For example, if the header 725 includes an order identifier for SDU 720, the layer 710 may hold onto received SDUs 720 until the layer 710 can send them onto the higher layer or data destination in their proper order.

Figure 11:
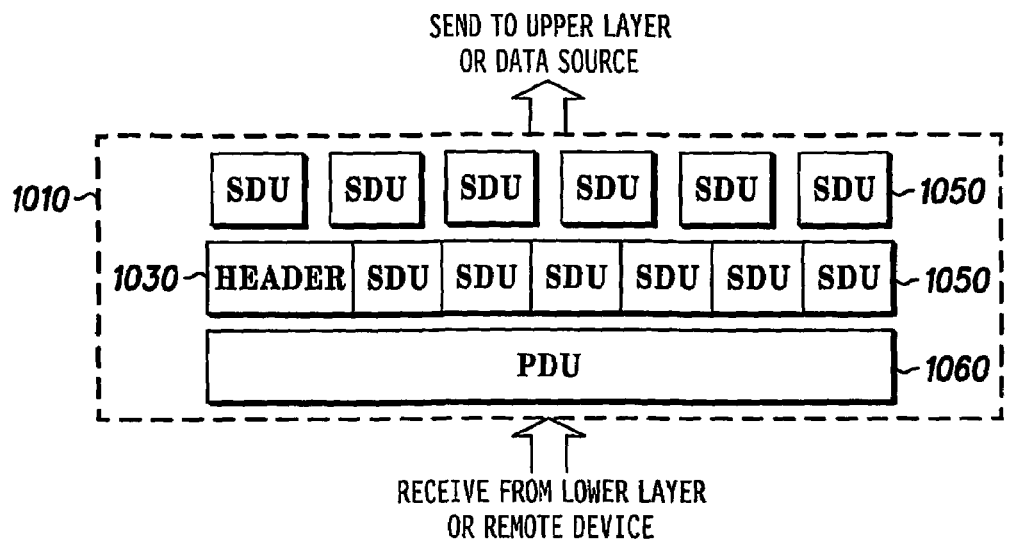
FIG. 11 is a block diagram of the data handling of a wireless device layer for reception with aggregation, according to a preferred embodiment of the present invention.

FIG. 11 is a block diagram of the data handling of a wireless device layer for reception with aggregation, according to a preferred embodiment of the present invention. As shown in FIG. 11, a layer 710 in a wireless device receives a plurality of PDUs 760 from a lower level or from a remote device. The layer 710 then processes the PDU 760 by stripping away the header 755, thus extracting the multiple SDUs 750. Finally, the SDUs 750 are either sent on to a higher layer or a local data destination.

The layer 710 will use data from the header 755 to extract the multiple SDUs 750 from the PDU 760, and to determine how the SDUs 720 should be further processed and routed. For example, if the header 755 includes an order identifier for SDU 750, the layer 710 may hold onto received SDUs 750 until the layer 710 can send them onto the higher layer or data destination in their proper order.

Figure 12:
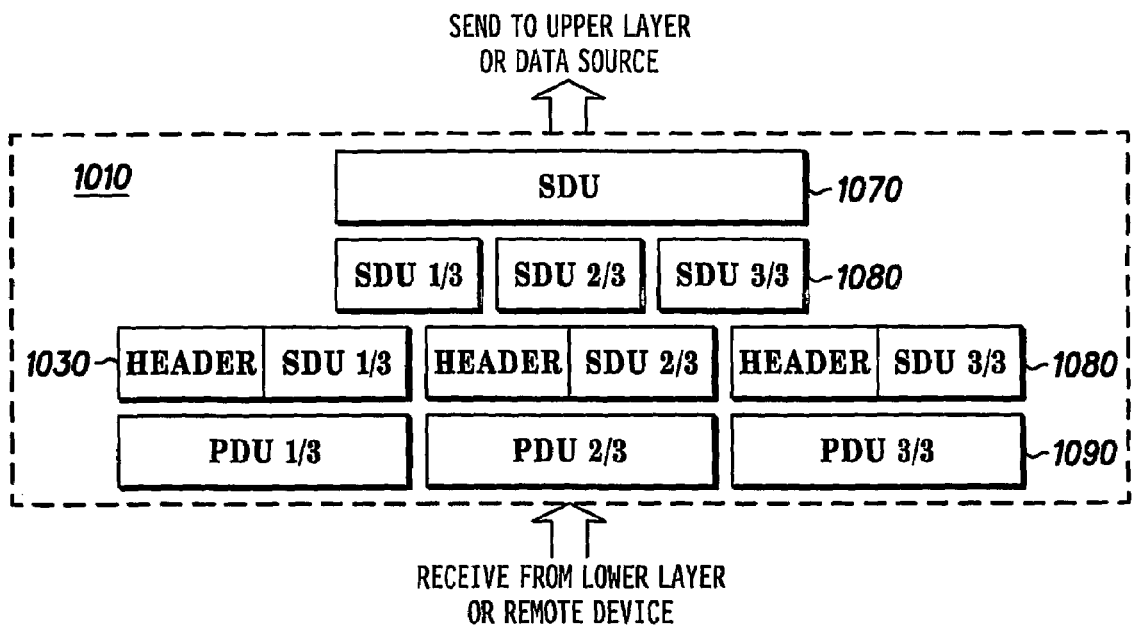
FIG. 12 is a block diagram of the data handling of a wireless device layer for reception with fragmentation, according to a preferred embodiment of the present invention.

FIG. 12 is a block diagram of the data handling of a wireless device layer for reception with fragmentation, according to a preferred embodiment of the present invention. As shown in FIG. 12, a layer 710 in a wireless device receives a number of PDUs 790 from a lower layer or from a remote device. The layer 710 then processes the PDUs 790 by extracting the SDU fragments 780, reassembling the SDU 770, and either sending the SDU 780 on to a higher layer or a local data destination. As a result, the layer must have some ability to store SDU fragments 780, since there may be a delay between when a first SDU fragment 780 for a given SDU 710 is received and when the final SDU fragment 780 is received.

The layer 710 will use data from the header 785 to reassemble the SDU 770 from the multiple SDU fragments 780, and to determine how the reassembled SDU 770 should be further processed and routed. For example, if the header 785 includes an order identifier for reassembled SDU 770, the layer 710 may hold onto received SDUs 770 until the layer 710 can send them onto the higher layer or data destination in their proper order.

Alternate PDU Format

Figure 13:
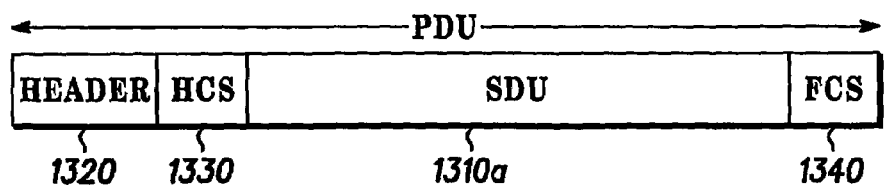
FIG. 13 shows a PHY PDU format for sending a single PHY SDU in a frame, according to a preferred embodiment of the present invention.

Although in the descriptions above each layer is described as simply adding a header to an SDU to create a PDU, other formats are possible. FIG. 13 shows a PHY PDU format for sending a single PHY SDU in a frame, according to a preferred embodiment of the present invention. FIG. 14 shows a PHY PDU format for sending multiple SDUs in a frame, according to a preferred embodiment of the present invention.

As shown in FIG. 13, a PHY PDU 1300 may include an SDU 1310, a header 1320, a header check sequence (HCS) 1330, and a frame check sequence (FCS). The SDU 1310 and header 1320 may an SDU 720 and header 725 as disclosed above with respect to FIG. 7. The SDU 1310 and header 1320 could also be an SDU fragment 780 and header 785 as described above with respect to FIG. 9.

The HCS 1330 provides a bit sequence for confirming proper transmission of the header, e.g., for performing a cyclic redundancy check (CRC) on the header 1320 when it is received at a receiving device. The FCS 1340 provides a bit sequence for confirming proper transmission of the entire frame, e.g., for performing a CRC on the whole frame when it is received at a receiving device.

As shown in FIG. 14, a PHY PDU 1400 may include a plurality of SDUs 750, a header 755, a header check sequence (HCS) 1330, and a frame check sequence (FCS). The SDUs 750 and header 755 may be formed as disclosed above with respect to FIG. 8. The HCS 1330 and FCS 1340 preferably operate as described above with respect to FIG. 13.

Alternate PDU formats could provide other information that could be used to increase signal quality or provide for error detection, e.g., a trailer. In general, a layer could add any extra bits relevant to that layer, which a corresponding layer would use to process the data.

Aggregation

As shown in FIG. 8, a transmitting layer using aggregation will combine a number of SDUs 750 into a group that will be used to form a single PDU 760. This can be advantageous in situations where the size of an SDU 750 at any layer is much smaller than the maximum allowable frame size.

In addition, this allows the smaller SDUs 750 to amortize the PDU overhead by reducing the number of PDUs needed. For example, fewer headers 755 will be required the more SDUs 750 are aggregated together. And each header takes up transmission time that is not being used for sending data.

Fragmentation and Defragmentation

As shown in FIG. 9, a transmitting layer using fragmentation will split up a single SDU 770 into multiple SDU fragments 780 and place these fragments 780 into multiple PDUs 790. Similarly, as shown in FIG. 12, a corresponding receiving layer using fragmentation will have to extract the proper SDU fragments 780 from a group of received PDUs 790 to recreate a given SDU 770.

For simplicity of discussion it will be assumed that the fragmentation is being performed at the same layer that as will transmit to a remote device. However, fragmentation is preferably performed at higher layers. In this case, the analysis is similar, except that the SDU fragments 780 become embedded in additional lower layer PDUs. In addition, it is also possible that fragmentation can be performed in multiple layers, i.e., SDU fragments 780 from a higher layer are further fragmented by a lower layer. In this case, each layer would have to perform its own defragmentation process.

Ideally, each transmitting device 310, 320 will send (as data frames) the PDUs 790 containing the SDU fragments 780 for a given SDU 770 in perfect order. The receiving device 310, 320 would then receive them in the same order and easily reconstruct the SDU 770.

For example, if an SDU 770 is separated into ten SDU fragments 780, then ideally the transmitting device will embed the ten SDU fragments 780 into ten PDUs 790 that will be transmitted, in order, to the receiving device 310, 320 as data frames. The receiving device 310, 320 will then, in order, receive the ten data frames containing the ten PDUs 790, extract the ten SDU fragments 780, and reconstruct the SDU 770. Only after all of the SDU fragments 780 that form a first SDU 770 were sent and received, would the transmitting device 310, 320 begin sending frames containing the SDU fragments 780 of a second SDU 770.

However, because of the realities of a wireless network, this is not always the case. Due to scheduling, transmission repetition, and channel properties, frames containing SDU fragments 780 (in PDUs 790) may be sent by the transmitting device 310, 320, and may arrive at the receiving device 310, 320 intertwined our out-of-order. As a result, the receiving device 310, 320 might receive an SDU fragment 780 from a second SDU 770 before it finishes receiving all of the SDU fragments 780 of a first SDU 770.

One reason a PDU 790 containing an SDU fragment 780 might be sent out of order is that the SDU fragment 780 of a second SDU 770 might be smaller than a SDU fragment 780 of a first SDU 770, and could fit into a portion of a time slot 440 that the SDU fragment 780 of the first SDU 770 would not. One reason a PDU 790 containing an SDU fragment 780 might arrive later than intended is that the PDU 790 might not be successfully received in an earlier transmission and might have to be resent at a later time.

As a result, it is preferable that the frame containing each SDU fragment 780 (i.e., each PDU 790) include a sequence number indicating the SDU 770 it belongs to, and a fragment number indicating its fragment location within its SDU 770. In addition, it is also preferable that the PDU 790 contain information indicating to the receiving device how many fragments a given SDU 770 has been broken up into. This information regarding the number of fragments can be passed in multiple ways, but in a preferred embodiment it is contained in the header 785.

Because the SDU fragments 780 for a given SDU 770 may arrive at different times, the receiving device 310, 320 will have to engage in some kind of static buffering of the received SDU fragments 780. In other words, upon receiving a PDU 790 containing a first received SDU fragment 780 (which may or may not be the sequentially first fragment of the corresponding SDU 770), the receiving device 310, 320 should set aside a buffer of the proper size to hold all of the SDU fragments 780 that make up the SDU 770.

By reading the header 785 contained in the of the first received PDU 790, the receiving device 310, 320 can determine the size of the SDU 770 the SDU fragment corresponds to and the total number of SDU fragments 780 to expect, which will allow it to set aside the proper amount of buffer space.

As each new PDU 790 containing a new SDU fragment 780 is received, the receiving device 310, 320 can place that SDU fragment 780 in its proper place in the buffer. Once all of the SDU fragments 780 have been received, the receiving device 310, 320 can reconstruct the SDU 770. Preferably the receiving device 310, 320 will have a buffer of sufficient size to contain multiple SDUs 770, since it may have to keep track of fragments from multiple SDUs 770 at the same time.

The only situation in which the receiving device 310, 320 will not have enough information to create a defragmentation buffer upon first receipt of an SDU fragment 780 is if it first receives the last SDU fragment 780. Since the last SDU fragment 780 may not be the same size as all of the prior SDU fragments 780, the receiving device 310, 320 can't rely on the length of the last SDU fragment 780 to be indicative of the length of the other SDU fragments 780.

Therefore, if the receiving device 310, 320 receives a PDU 790 including a header 785 that indicates that the total number of SDU fragments 780 and the current fragment number are the same (i.e., the PDU 790 contains the last SDU fragment 780), then the SDU fragment 780 contained in that PDU 790 must be handled differently. The receiving device 310, 320 must buffer the last SDU fragment 780 and wait for the next received PDU 790 containing an SDU fragment 780 associated with the same SDU 770. The SDU fragment 780 in that next PDU 790 will be the proper size, and can be used to create the defragmentation buffer.

Similar problems occur in other embodiments. In general, accounting for these and other related defragmentation issues can increase the complexity and cost of the receiving device and can reduce its data processing speed.

But fragmentation offers some advantages as well. Smaller data frames (sometimes called packets) have a lower probability of running into transmission problems (i.e., have a lower packet error rate). Thus, in a noisy or otherwise problematic channel, reducing the frame size can reduce packet error rates and thus increase throughput in the channel.

In many systems fragmentation will be used when the channel quality deteriorates and it is desirable to send smaller frames.

Transmitting Frames Between Devices

Figure 16:
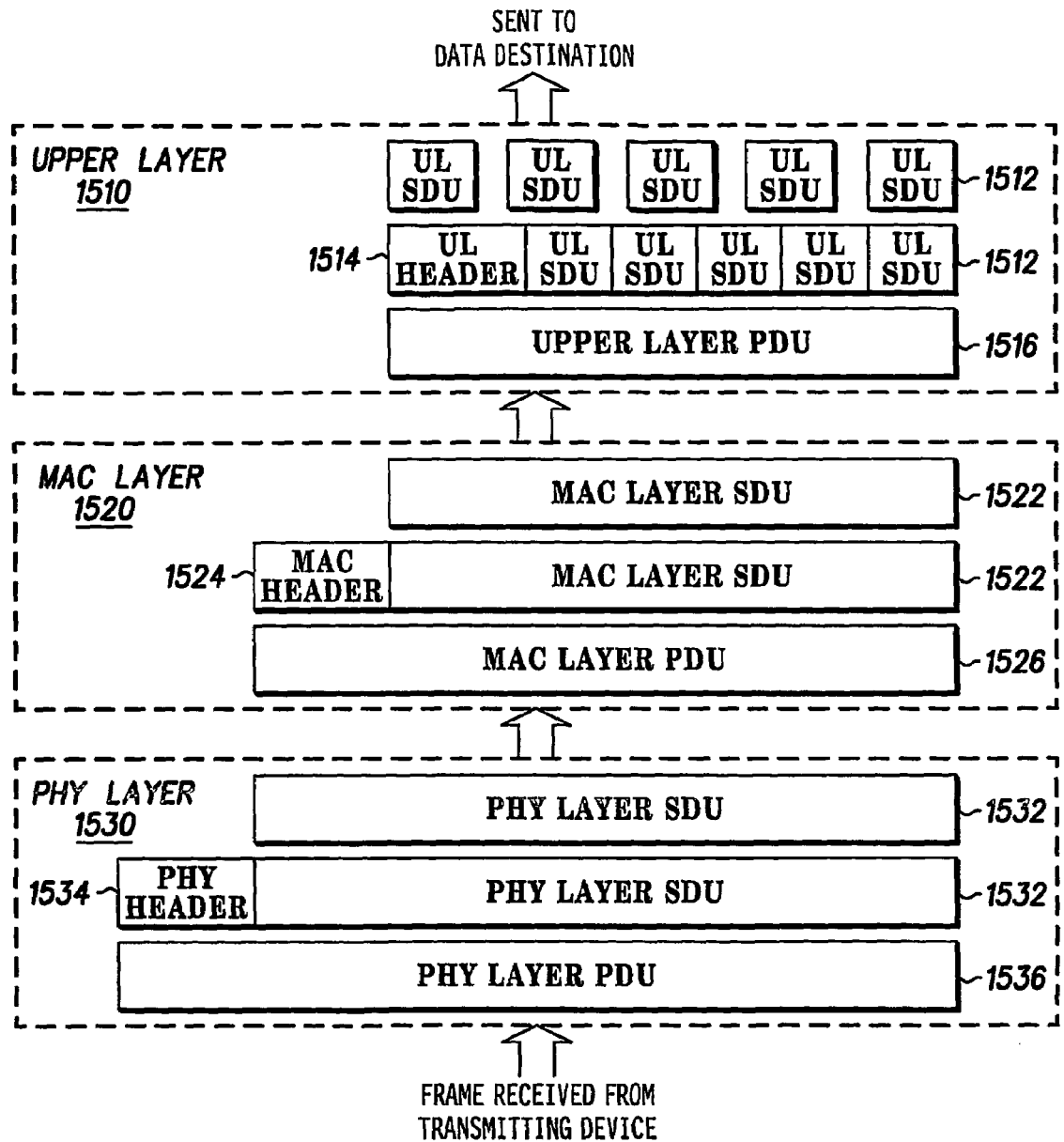
FIG. 16 is a block diagram of a three-layer receiving device employing aggregation according to a preferred embodiment of the present invention.

FIG. 15 is a block diagram of a three-layer transmitting device employing aggregation according to a preferred embodiment of the present invention. FIG. 16 is a block diagram of a three-layer receiving device employing aggregation according to a preferred embodiment of the present invention. Although these figures show three-layer devices, other embodiments could use more or fewer layers.

As shown in FIG. 15, the transmitting device 1500 includes an upper layer 1510, a medium access control (MAC) layer 1520, and a physical (PHY) layer 1530. In one embodiment the upper layer 1510 can be a frame convergence sub-layer.

The upper layer 1510 receives data from a data source in the form of upper layer (UL) service data units (SDUs) 1512. It then processes these upper level SDUs 1512, aggregates a plurality of them into a group, and adds an upper level header 1514 to this group of upper level SDUs 1512 to form an upper level PDU 1516. The upper level 1510 then sends this upper level PDU 1516 to the MAC layer 1522, which receives it as a MAC layer SDU 1522.

In some embodiments these upper layer SDUs 1512 could be MPEG cells, ATM cells, or IP datagrams. However, other SDU formats and types can be used in other embodiments.

The MAC layer 1520 then processes the MAC level SDU 1522 and adds a MAC level header 1524 to it to form a MAC level PDU 1526. The MAC level 1520 then sends this MAC level PDU 1526 to the PHY layer 1532, which receives it as a PHY layer SDU 1532.

The PHY layer 1530 then processes the PHY level SDU 1532 and adds a PHY level header 1534 to it to form a PHY level PDU 1536. The PHY level 1530 then transmits this PHY level PDU 1536 to a remote device as a data frame.

As shown in FIG. 16, the receiving device 1600 includes an upper layer 1510, a MAC layer 1520, and a PHY layer 1530. In a preferred embodiment every device 310, 320 can perform the functions of a transmitting device 1500 and a receiving device 1600 listed in FIGS. 15 and 16. Alternate embodiments could be provided, however, in which a device only performed transmitting functions or receiving functions. However, this is not preferred given the benefits of being able to receive signal quality feedback from a receiver.

The PHY layer 1530 receives a data frame from a remote device as a PHY layer PDU 1536. It then processes the PHY layer PDU 1536, stripping off the PHY header 1534 to extract the PHY layer SDU 1532. Finally, the PHY layer 1530 sends the PHY layer SDU 1532 to the MAC layer 1520 as a MAC layer PDU 1526.

The MAC layer 1520 then processes the MAC level PDU 1526, stripping off the MAC header 1524 to extract the MAC layer SDU 1522. Finally, the MAC layer 1520 sends the MAC layer SDU 1522 to the upper layer 1510 as an upper layer PDU 1516.

The upper layer 1510 then processes the upper level PDU 1516, stripping off the upper layer header 1514 to extract multiple upper layer SDUs 1512 contained in the upper layer PDU 1516. Finally, the upper layer 1520 sends the upper layer SDUs 1512 to a data destination.

Although the embodiment of FIGS. 15 and 16 uses aggregation, an embodiment that did not use aggregation would operate substantially the same in the MAC and PHY layers 1520 and 1530. The upper layer 1510 in the transmitter would operate like the layer 710 in FIG. 7, and the upper layer 1510 in the receiver would operate like the layer 710 in FIG. 10.

Figure 17:
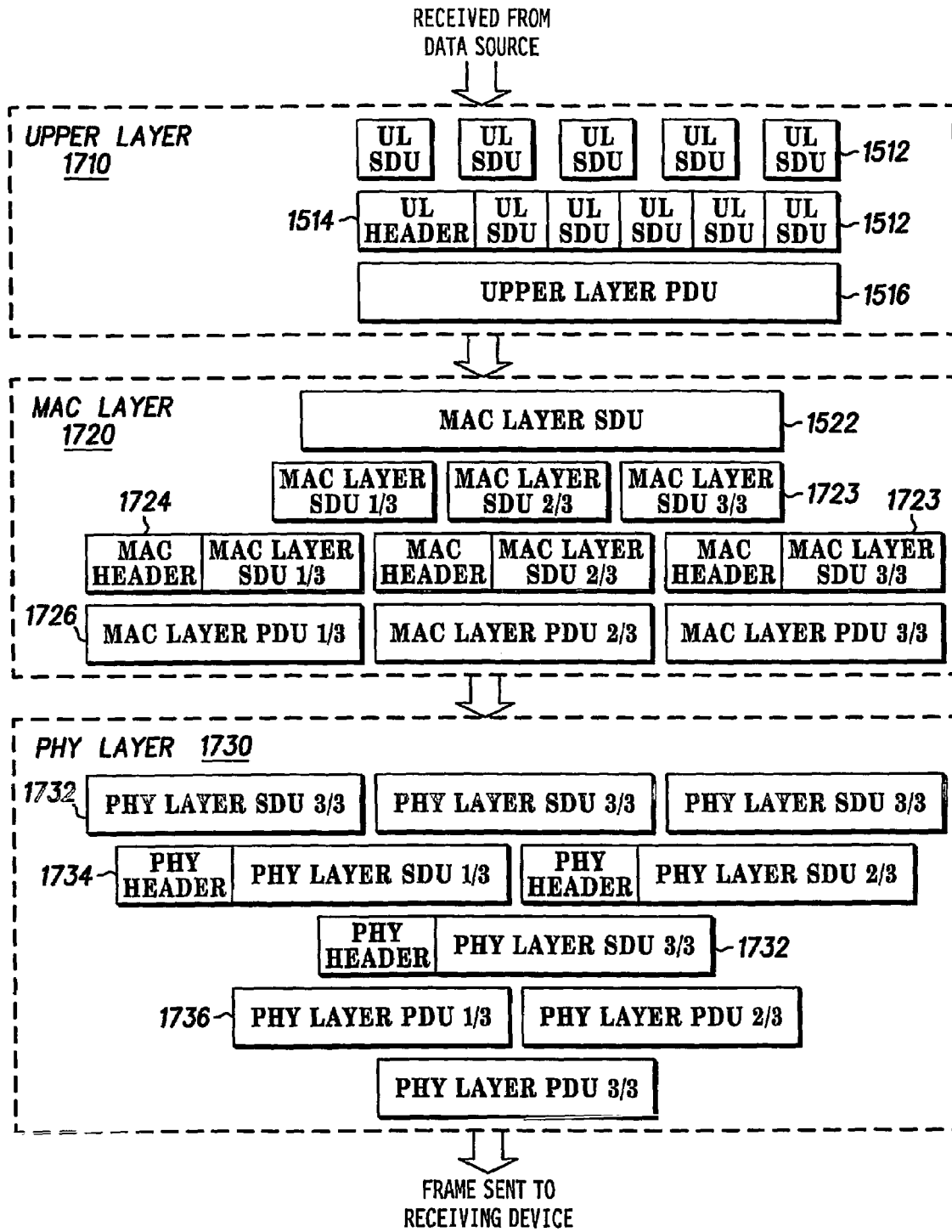
FIG. 17 is a block diagram of a three-layer transmitting device employing aggregation and fragmentation according to a preferred embodiment of the present invention.
Figure 18:
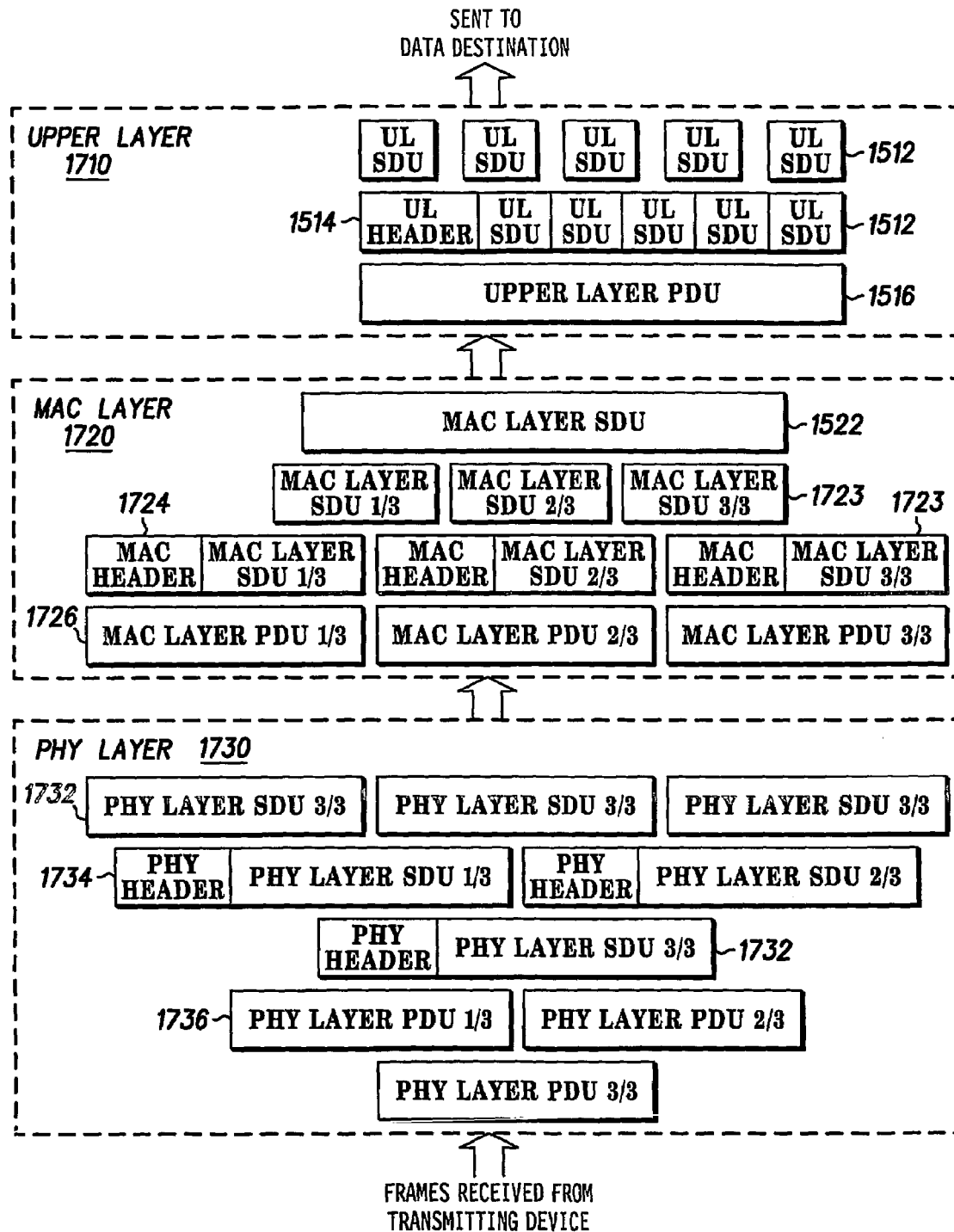
FIG. 18 is a block diagram of a three-layer receiving device employing aggregation and fragmentation according to a preferred embodiment of the present invention.

FIG. 17 is a block diagram of a three-layer transmitting device employing aggregation and fragmentation according to a preferred embodiment of the present invention. FIG. 18 is a block diagram of a three-layer receiving device employing aggregation and fragmentation according to a preferred embodiment of the present invention. Although these figures show three-layer devices, other embodiments could use more or fewer layers.

As shown in FIG. 17, the transmitting device 1700 includes an upper layer 1710, a medium access control (MAC) layer 1720, and a physical (PHY) layer 1730. In one embodiment the upper layer 1710 can be a frame convergence sub-layer.

The upper layer 1710 receives data from a data source in the form of upper layer (UL) service data units (SDUs) 1512. It then processes these upper level SDUs 1512, aggregates a plurality of them into a group, and adds an upper level header 1514 to this group of upper level SDUs 1512 to form an upper level PDU 1516. The upper level 1510 then sends this upper level PDU 1516 to the MAC layer 1522, which receives it as a MAC layer SDU 1522.

The MAC layer 1720 then processes the MAC layer SDU 1522. However, because of system restrictions (e.g., sent from the PHY layer), the MAC layer 1720 may be restricted in the PDU size it can use. For example, if the channel quality for a given transmission falls, the PHY layer 1730 may provide information requiring the MAC layer 1720 to use a smaller PDU size. If this PDU size drops below the current MAC layer SDU size plus the header size, the MAC layer 1720 will have to fragment the MAC layer SDU 1522.

In this case, the MAC layer 1720 will break the MAC layer SDU 1522 up into multiple MAC layer SDU fragments 1723 and add an appropriate MAC level header 1724 to them to form multiple corresponding MAC level PDUs 1726. The MAC level 1720 then sends these MAC level PDUs 1726 to the PHY layer 1732, which receives it as a PHY layer SDUs 1732.

The PHY layer 1730 then processes the PHY level SDUs 1732 and adds a PHY level header 1734 to each of them to form multiple PHY level PDUs 1736. The PHY level 1730 then transmits these PHY level PDUs 1736 to a remote device as a data frame.

As shown in FIG. 18, the receiving device 1800 includes an upper layer 1810, a MAC layer 1820, and a PHY layer 1830. In a preferred embodiment every device 310, 320 can perform the functions listed in FIGS. 17 and 18. Alternate embodiments could be provided, however, in which a device only performed transmitting functions or receiving functions, although this is not preferred.

The PHY layer 1730 receives a series of data frame from a remote device as a series of PHY layer PDUs 1736. It then processes the PHY layer PDUs 1736, stripping off the PHY headers 1734 to extract the PHY layer SDUs 1732. Finally, the PHY layer 1730 sends the PHY layer SDUs 1732 to the MAC layer 1720 as a MAC layer PDUs 1726.

The MAC layer 1720 then processes the MAC level PDUs 1526, stripping off the MAC headers 1524 to extract the MAC layer SDU fragments 1523 they contain. Then the MAC layer 1720 performs a defragmentation process to reconstruct the MAC layer SDU 1722 represented by the MAC layer SDU fragments 1723. Finally, the MAC layer 1720 sends the MAC layer SDU 1522 to the upper layer 1710 as an upper layer PDU 1516.

The upper layer 1710 then processes the upper level PDU 1516, stripping off the upper layer header 1514 to extract multiple upper layer SDUs 1512 contained in the upper layer PDU 1516. Finally, the upper layer 1720 sends the upper layer SDUs 1512 to a data destination.

Although this process is functional, it is also unnecessarily complex. In the transmitter's upper layer 1710 multiple upper layer SDUs 1512 are aggregated into a single upper layer PDU 1516 that becomes the MAC layer SDU 1522. But then in the MAC layer 1720, the MAC layer SDU 1522 is fragmented into multiple MAC layer SDU fragments 1723. This then requires the receiver's MAC layer 1720 to have to defragment incoming MAC SDU fragments 1723, and also requires the receiver's upper layer to separate the aggregated upper level SDUs 1512 from the upper layer PDU 1514.

Dynamic Aggregation

It would be far more efficient to simply have the transmitter's upper layer 1710 only aggregate as many upper layer SDUs 1512 as will fit in a desired MAC SDU size. This will allow the device to operate as the transmitter 1500 disclosed in FIG. 15 and will avoid the need for fragmentation, greatly simplifying operation.

One way to accomplish this would be to keep the maximum allowable MAC SDU size at a point where fragmentation would never be required no matter what the requirements from the PHY layer. However, this would significantly reduce the device's efficiency when channel quality was good.

A solution to this problem is to dynamically modify the upper layer PDU size based on requirements for data frame size. In other words the based on feedback from the MAC layer and the PHY layer, the upper layer will alter the number of upper layer SDUs it aggregates into a single upper layer PDU. When conditions are favorable (e.g., good channel quality), the upper layer will aggregate more upper layer SDUs into a single upper layer PDU. This will allow more data to be sent per frame, but since the conditions are favorable, this is not a problem.

And when conditions become unfavorable, the upper layer will reduce the number of upper layer SDUs it aggregates into a single upper layer PDU. This will reduce the size of the MAC layer PDU to the point where it does not need to be fragmented to provide the PHY layer with a PHY layer PDU of a desired size.

Then, when conditions become favorable again, the upper layer can again increase the number of upper layer SDUs it aggregates into a single upper layer PDU.

Figure 19:
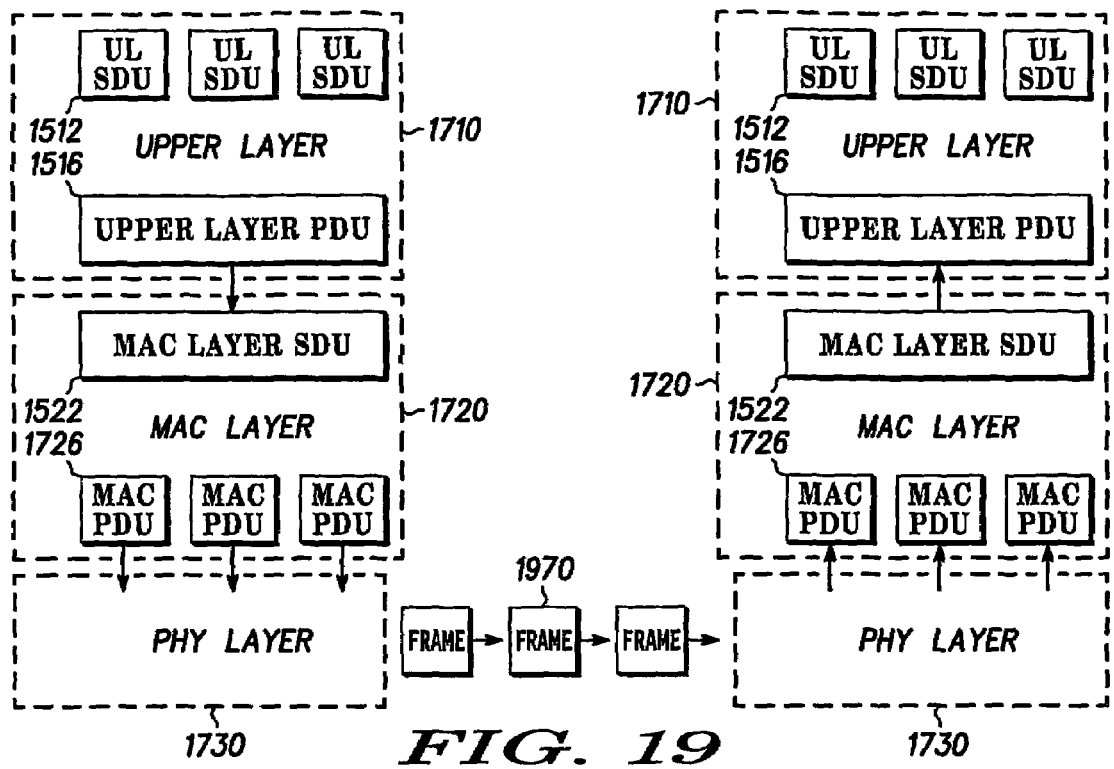
FIG. 19 is a block diagram showing two wireless devices communicating using fragmentation.

FIG. 19 is a block diagram showing two wireless devices communicating using fragmentation. As shown in FIG. 19, without aggregation feedback, an upper layer 1710 will always aggregate the same number of upper layer SDUs 1512 into an upper layer PDU 1516. In many instances this upper layer PDU 1516 will be too large for the MAC layer 1720 to pass whole, requiring the MAC layer 1720 to fragment it and send it to the PHY layer 1730 in multiple MAC layer SDUs 1726. This in turn will require the PHY layer 1730 to send the data from the fragmented upper layer PDU 1516 in multiple data frames 1970.

The receiving device 1800 will then receive those frames 1970, ultimately providing MAC layer SDUs 1726 to the MAC layer 1720, which must be used to defragment the original MAC layer SDU 1522. Finally, that MAC layer SDU 1522 will be sent to the upper layer 1710 as an upper layer PDU 1516, and the upper layer SDUs 1512 can be extracted for further processing.

Figure 20:
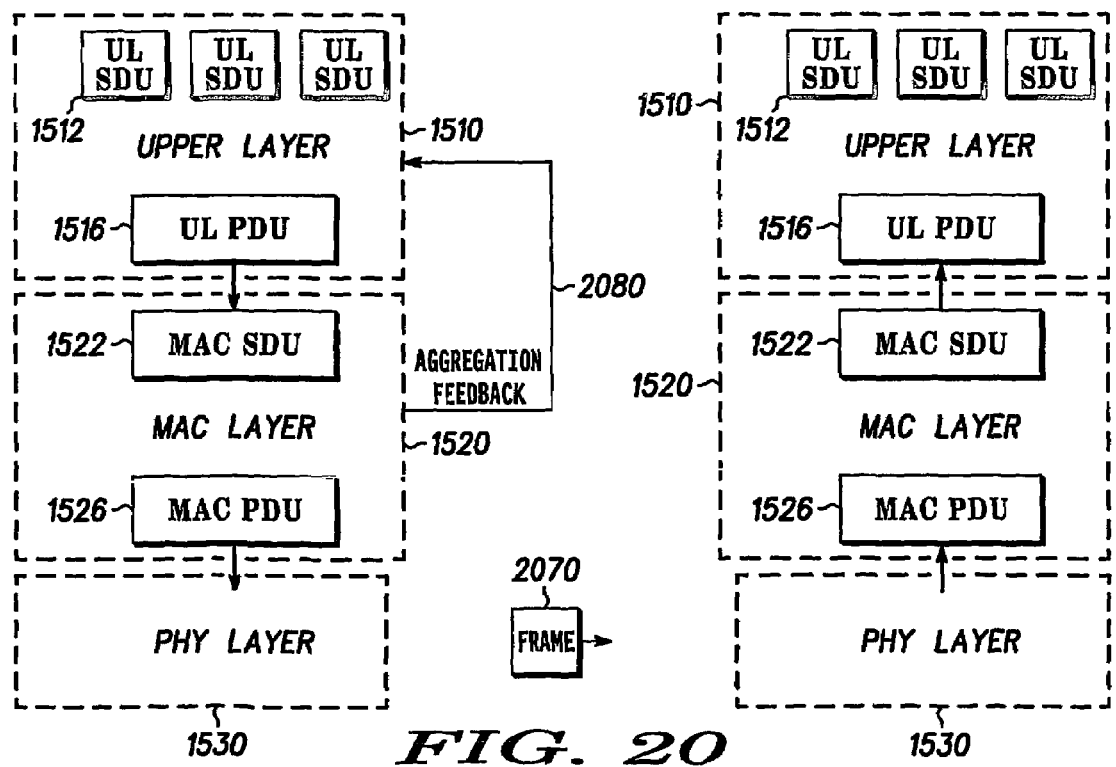
FIG. 20 a block diagram showing two wireless devices communicating using dynamic aggregation, according to a preferred embodiment of the present invention.

However, with aggregation feedback, a MAC layer will never (or at least rarely) have to engage in fragmentation. FIG. 20 a block diagram showing two wireless devices communicating using dynamic aggregation, according to a preferred embodiment of the present invention.

As shown in FIG. 20, the upper layer 1510 will aggregate a number of upper layer SDUs 1512 into an upper layer PDU 1516 as required by an aggregation feedback signal 2080 from the MAC layer 1520. Preferably this will be a set number that can be changed periodically. Because the current aggregation number is based on current data from the MAC and PHY layers 1520 and 1530, it will preferably represent the largest number of upper layer SDUs 1512 that can be aggregated into a single upper layer PDU 1516 without requiring fragmentation at the MAC layer 1520. This will maximize data flow without requiring the added complexity of fragmentation. Thus, the MAC layer 1520 will only have to generate a single MAC layer PDU 1526 corresponding to each MAC layer SDU 1522, and the PHY layer 1530 will only have to send a single frame 2070 containing all the data in that upper layer SDU 1516.

The receiving device 1600 will then only have to receive that single frame 2070 at its PHY layer 1530 to provide the MAC layer 1520 with a MAC layer PDU 1526 that can be converted into the original MAC layer SDU 1522 without the need for defragmentation. That MAC layer SDU 1522 can then be sent to the upper layer 1510 as an upper layer PDU 1516 and the upper layer SDUs 1512 can be extracted for further processing.

In some embodiments fragmentation can be avoided altogether. In this case, any larger upper layer PDUs 1516/MAC layer SDUs 1522 that are in the pipeline when a feedback instruction comes to lower the upper layer PDU size will be sent regardless of the fact that they are too large, and the system will accept the possibility that they will fail. In alternate embodiments when a feedback instruction comes to lower the upper layer PDU size, a few larger MAC layer SDUs 1522 can be fragmented until the smaller upper layer PDUs 1516 can be created.

Figure 21:
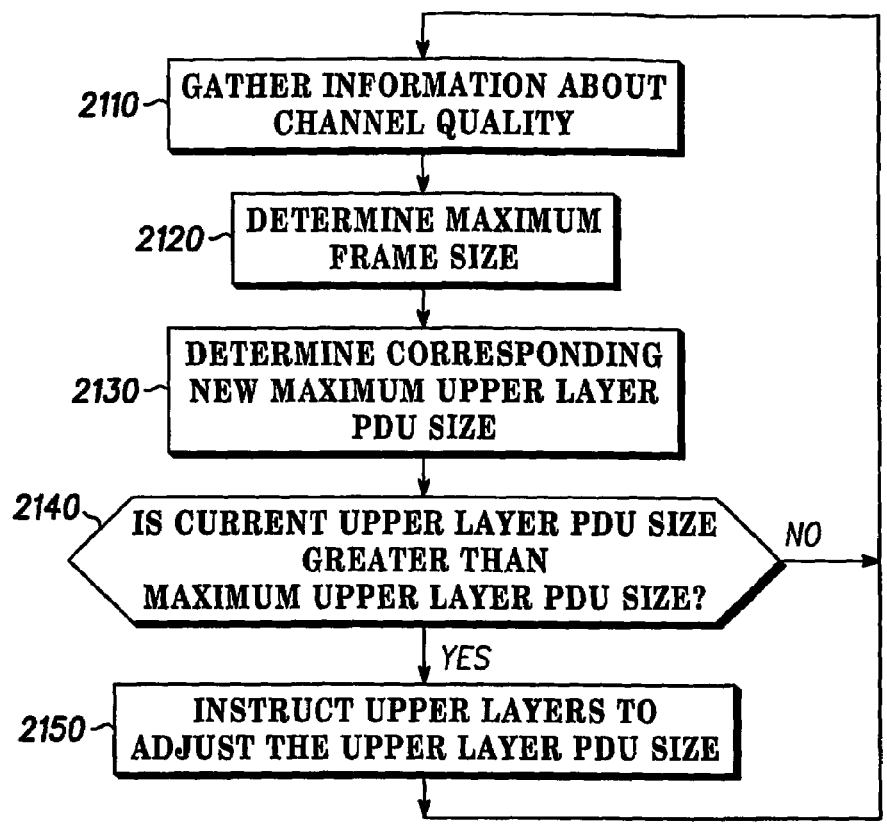
FIG. 21 is a flow chart showing a dynamic aggregation process for preventing fragmentation, according to a preferred embodiment of the present invention.
Figure 22:
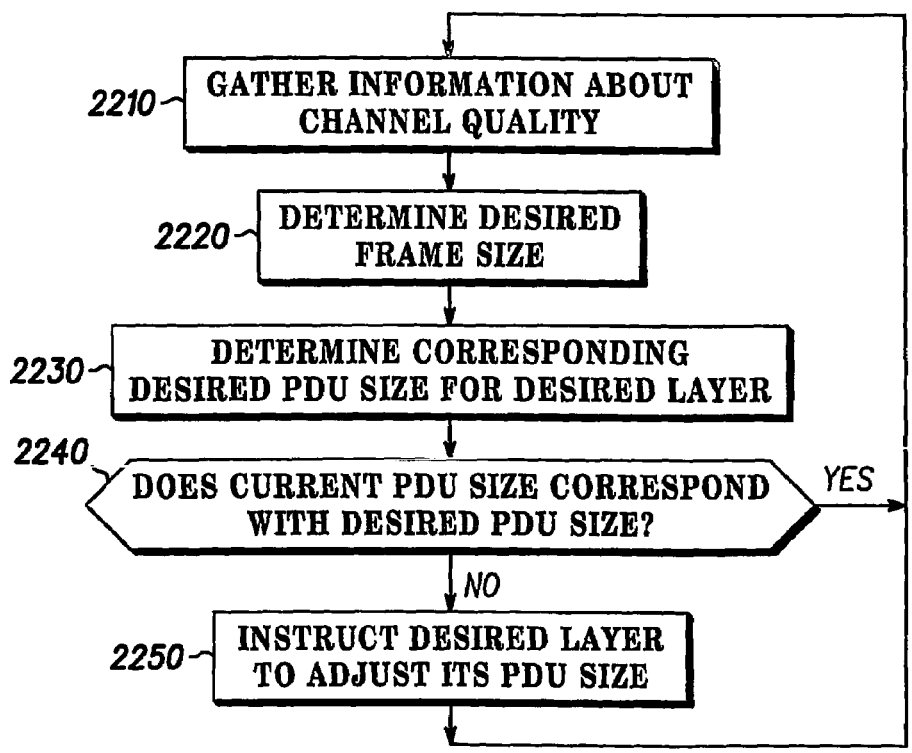
FIG. 22 is a flow chart showing a dynamic aggregation process for preventing fragmentation and maximizing frame size, according to a preferred embodiment of the present invention.

FIGS. 21 and 22 are flow charts showing a dynamic aggregation process according to a preferred embodiment of the present invention. In particular, FIG. 21 is a flow chart showing a dynamic aggregation process for preventing fragmentation, and FIG. 22 is a flow chart showing a dynamic aggregation process for preventing fragmentation and maximizing frame size.

As shown in FIG. 21, a transmitting device first gathers information regarding the channel quality. (Step 2110) Based on this information, the device then determines a maximum frame size that can be reliably sent. (Step 2120) Based on the maximum frame size, the device then determines what a corresponding maximum PDU size would be for a given layer in the device, e.g., the MAC layer. (Step 2130)

In preferred embodiments the channel quality may be determined by examining the bit error rate (BER) of the current data stream, the frame error rate (FER) of the current data stream based on received acknowledgement (ACK) frames, the soft error rate (SER) of the current data stream, or other quality of service (QoS) parameters, or other feedback from the receiver. Some of these metrics can be calculated by the transmitted, e.g., by analyzing acknowledgement frames, and others must be sent to the transmitter by the receiver.

The device (through an appropriate layer) then determines whether the current PDU size used for that layer is greater than the maximum PDU size. (2140) If it is not, then the device continues to monitor the channel quality, but otherwise takes no additional action regarding PDU size (i.e., it returns to Step 2110).

If, however, the current PDU size used by the layer is greater than the maximum PDU size, the device will (at an appropriate layer) reduce the PDU size to be less than the maximum PDU size. (Step 2150) This can be achieved, for example, through the use of an aggregation feedback signal, as shown in FIG. 20.

In this way the device can avoid the use of fragmentation as channel quality decreases. This can be used in a situation where the primary concern is to avoid fragmentation.

As shown in FIG. 22, a transmitting device first gathers information regarding the channel quality. (Step 2210) Based on this information, the device determines a desired frame size that can carry the greatest amount of data without requiring fragmentation. (Step 2220). Based on the desired frame size, the device then determines what a corresponding desired PDU size would be for a given layer in the device, e.g. the MAC layer. (Step 2230)

As with the method of FIG. 21, in preferred embodiments the channel quality may be determined by examining the bit error rate (BER) of the current data stream, the frame error rate (FER) of the current data stream based on received ACK frames, the soft error rate (SER) of the current data stream, other quality of service (QoS) parameters, or feedback from the receiver. Some of these metrics can be calculated by the transmitted, e.g., by analyzing acknowledgement frames, and others must be sent to the transmitter by the receiver.

The device (through an appropriate layer) then determines whether the current PDU size for that layer corresponds to the desired PDU size. (Step 2240) In some embodiments this can require that the current PDU size be exactly equal to the desired PDU size. In other embodiments this can require that the current PDU size be within a certain desired range around the desired PDU size, possible with the requirement that it not exceed a maximum size.

If the current PDU size does correspond with the desired PDU size, then the device will continue to monitor the channel quality, but will otherwise take no additional action regarding PDU size (i.e., it returns to Step 2210).

If, however, the current PDU size used by the layer does not correspond with the desired PDU size (whether too high or too low), the device will (at an appropriate layer) alter the PDU size to conform to the desired PDU size. (Step 2250) This can be achieved, for example, through the use of an aggregation feedback signal, as shown in FIG. 20.

In this way the device can maintain the largest allowable frame size without requiring the use of fragmentation. One way to achieve this is to monitor the throughput resulting from a given frame size (e.g., through BER). Initially increased frame size will increase throughput as the same overhead covers more payload. But at a certain point an increase will lower the throughput. By monitoring BER, a device can determine a desired frame length.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for dynamically controlling aggregation in an ultrawide bandwidth wireless device, comprising:
    receiving a plurality of intermediate service data units at an intermediate layer;
    aggregating at least two of the plurality of intermediate service data units in the intermediate layer to form an intermediate protocol data unit;
    sending the intermediate protocol data unit from the intermediate layer to a physical layer;
    generating a data frame in the physical layer based on the intermediate protocol data unit and information corresponding to the physical layer;
    transmitting the data frame from the physical layer in a data stream; and
    adjusting an intermediate size criteria for use by the intermediate protocol data unit in future transmissions, based on a desired frame size criteria for the data frame,
    wherein the aggregating of the at least two of the plurality of intermediate layer service data units is performed such that an actual intermediate layer protocol data unit size corresponds to the intermediate size criteria.

2. A method for dynamically controlling aggregation in an ultrawide bandwidth wireless device, as recited in claim 1, wherein the intermediate size criteria requires that the actual intermediate protocol data unit size be between a minimum intermediate protocol data unit size and a maximum intermediate protocol data unit size.

3. A method for dynamically controlling aggregation in an ultrawide bandwidth wireless device, as recited in claim 1, wherein the desired frame size criteria requires that the actual frame size be between a minimum frame size and a maximum frame size.

4. A method for dynamically controlling aggregation in an ultrawide bandwidth wireless device, as recited in claim 1, wherein the intermediate layer is a medium access control layer.

5. A method for dynamically controlling aggregation in an ultrawide bandwidth wireless device, as recited in claim 1, further comprising determining the desired frame size criteria based on one of: a bit error rate of the data stream, a soft error rate of the data stream, a frame error rate of the data stream, a quality of service criteria, and feedback data from a remote device.

6. A method for dynamically controlling aggregation in an ultrawide bandwidth wireless device, as recited in claim 1, practiced in an integrated circuit.

7. A method for dynamically controlling aggregation in an ultrawide bandwidth wireless device, as recited in claim 1, practiced in an ultrawide bandwidth transceiver.

8. A method for dynamically controlling aggregation in an ultrawide bandwidth wireless device, comprising:
    receiving a plurality of data packets at an upper layer;
    aggregating at least two of the plurality of data packets in the upper layer to form an upper protocol data unit;
    sending the upper protocol data unit from the upper layer to an intermediate layer;
    generating an intermediate protocol data unit in the intermediate layer based on the upper protocol data unit and intermediate identifying information corresponding to the intermediate layer;
    sending the intermediate protocol data unit from the intermediate layer to a physical layer;
    generating a data frame in the physical layer based on the intermediate protocol data unit and physical identifying information corresponding to the physical layer;
    transmitting the data frame from the physical layer in a data stream; and
    adjusting an upper size criteria for use by the upper protocol data units in future transmissions based on a desired frame size criteria for the data frame,
    wherein the aggregating of the two or more of the plurality of data packets is performed such that an actual upper protocol data unit size does not deviate from the upper size criteria.

9. A method for dynamically controlling aggregation in an ultrawide bandwidth wireless device, as recited in claim 8, wherein the upper size criteria requires that the actual upper protocol data unit size be between a minimum upper protocol data unit size and a maximum upper protocol data unit size.

10. A method for dynamically controlling aggregation in an ultrawide bandwidth wireless device, as recited in claim 8, wherein the desired frame size criteria requires that the actual frame size be between a minimum frame size and a maximum frame size.

11. A method for dynamically controlling aggregation in an ultrawide bandwidth wireless device, as recited in claim 8, wherein the intermediate layer is a medium access control layer.

12. A method for dynamically controlling aggregation in an ultrawide bandwidth wireless device, as recited in claim 8, further comprising determining the desired frame size criteria based on one of: a bit error rate of the data stream, a soft error rate of the data stream, a frame error rate of the data stream, a quality of service criteria, and feedback data from a remote device.

13. A method for dynamically controlling aggregation in an ultrawide bandwidth wireless device, as recited in claim 8, practiced in an integrated circuit.

14. A method for dynamically controlling aggregation in an ultrawide bandwidth wireless device, as recited in claim 8, practiced in an ultrawide bandwidth transceiver.

15. A method for dynamically controlling aggregation in an ultrawide bandwidth wireless device, as recited in claim 8, further comprising sending a feedback signal from the intermediate layer to the upper layer, indicating the upper size criteria.

16. A method for dynamically controlling aggregation in an ultrawide bandwidth wireless device, as recited in claim 8, wherein the data packets are one of: MPEG cells, ATM cells, or IP datagrams.

17. A device for dynamically aggregating data packets, comprising:
   an upper layer configured to receive a plurality of data packets and aggregate the plurality of data packets into an upper protocol data unit;
   an intermediate layer configured to receive the upper protocol data unit from the upper layer and form an intermediate protocol data unit based on the upper protocol data unit and intermediate identifying information corresponding to the intermediate layer;
   a physical layer configured to receive the intermediate protocol data unit from the intermediate layer, form a data frame based on the intermediate protocol data unit, and transmit the data frame in a data stream; and
   an aggregation control circuit configured to select an upper size criteria for the intermediate protocol data unit based on a desired frame size criteria for the data frame, and to provide a feedback signal to the upper layer indicating the upper size criteria,
   wherein the an upper layer aggregates at least two of the plurality of data packets into an upper protocol data unit based on the feedback signal.

18. A device for dynamically aggregating data packets, as recited in claim 17, wherein the upper size criteria requires that the actual upper protocol data unit size be between a minimum upper layer protocol data unit size and a maximum upper layer protocol data unit size.

19. A device for dynamically aggregating data packets, as recited in claim 17, wherein the desired frame size criteria requires that the actual frame size be between a minimum frame size and a maximum frame size.

20. A device for dynamically aggregating data packets, as recited in claim 17, wherein the intermediate layer is a medium access control layer.

21. A device for dynamically aggregating data packets, as recited in claim 17, wherein the aggregation control circuit determines the desired frame size criteria based on one of a bit error rate of the data stream, a soft error rate of the data stream, a frame error rate of the data stream, a quality of service criteria, and feedback data from a remote device.

22. A device for dynamically aggregating data packets, as recited in claim 17, wherein the device is formed in an integrated circuit.

23. A device for dynamically aggregating data packets, as recited in claim 17, wherein the device is formed in an ultrawide bandwidth transceiver.

24. A device for dynamically aggregating data packets, as recited in claim 17, wherein the data packets are one of: MPEG cells, ATM cells, or IP datagrams.

* * * * *